(12) United States Patent
Wierda et al.

(10) Patent No.: US 11,391,559 B2
(45) Date of Patent: Jul. 19, 2022

(54) SYSTEM AND METHOD FOR DETERMINATION OF A SPATIAL PROPERTY OF A SUBMERGED OBJECT IN A 3D-SPACE

(71) Applicant: FNV IP B.V., Leidschendam (NL)

(72) Inventors: Stefan Mark Wierda, Woerden (NL); Evert Schippers, Leimuiden (NL)

(73) Assignee: FUGRO N.V.

( * ) Notice: Subject to any disclaimer, the term of this patent is extended or adjusted under 35 U.S.C. 154(b) by 390 days.

(21) Appl. No.: 16/645,339

(22) PCT Filed: Sep. 5, 2018

(86) PCT No.: PCT/NL2018/050569
§ 371 (c)(1),
(2) Date: Mar. 6, 2020

(87) PCT Pub. No.: WO2019/050396
PCT Pub. Date: Mar. 14, 2019

(65) Prior Publication Data
US 2021/0123717 A1 Apr. 29, 2021

(30) Foreign Application Priority Data
Sep. 8, 2017 (NL) ...................................... 2019516

(51) Int. Cl.
*G01B 11/00* (2006.01)
*B63G 8/00* (2006.01)

(52) U.S. Cl.
CPC ............ *G01B 11/002* (2013.01); *B63G 8/001* (2013.01); *B63G 2008/005* (2013.01)

(58) Field of Classification Search
CPC ...... G01B 11/002; G01B 21/04; B63G 8/001; B63G 2008/005; G06T 7/70
See application file for complete search history.

(56) References Cited

U.S. PATENT DOCUMENTS 9,189,859 B2 * 11/2015 Vogiatis ............... H04N 13/271
9,729,789 B2 * 8/2017 Horak .................. G06T 3/4038
(Continued)

FOREIGN PATENT DOCUMENTS

WO  2016075231 A1  5/2016
WO  2019050396 A1  3/2019

OTHER PUBLICATIONS

International Search Report and Written Opinion; PCT Application No. PCT/NL2018/050569; dated Feb. 22, 2019.

*Primary Examiner* — Anthony D Wiest
(74) *Attorney, Agent, or Firm* — Polsinelli PC

(57) ABSTRACT

Method for determining a spatial property of a submerged object in a 3D-space, using an underwater moveable platform, that is provided with a camera and with a position and orientation measurement system configured to output a position and orientation of the camera. The method includes receiving user input for visually fitting a bounding volume to the object, and determining the spatial property of the object based on a corresponding spatial property of a bounding volume once the user is satisfied that the bounding volume sufficiently fits the object. The method provides an interactive manner of visually fitting the bounding volume to the object, based on images of the object taken at different positions and/or orientations of the camera relative to the object, as well as on a representation of a position and orientation of the camera in the 3D space at the time each image was captured.

24 Claims, 9 Drawing Sheets

(56) References Cited

U.S. PATENT DOCUMENTS

2006/0152589 A1\* 7/2006 Morrison ................. G06T 7/74
                                                    348/208.1
2015/0360877 A1   12/2015 Shin \* cited by examiner

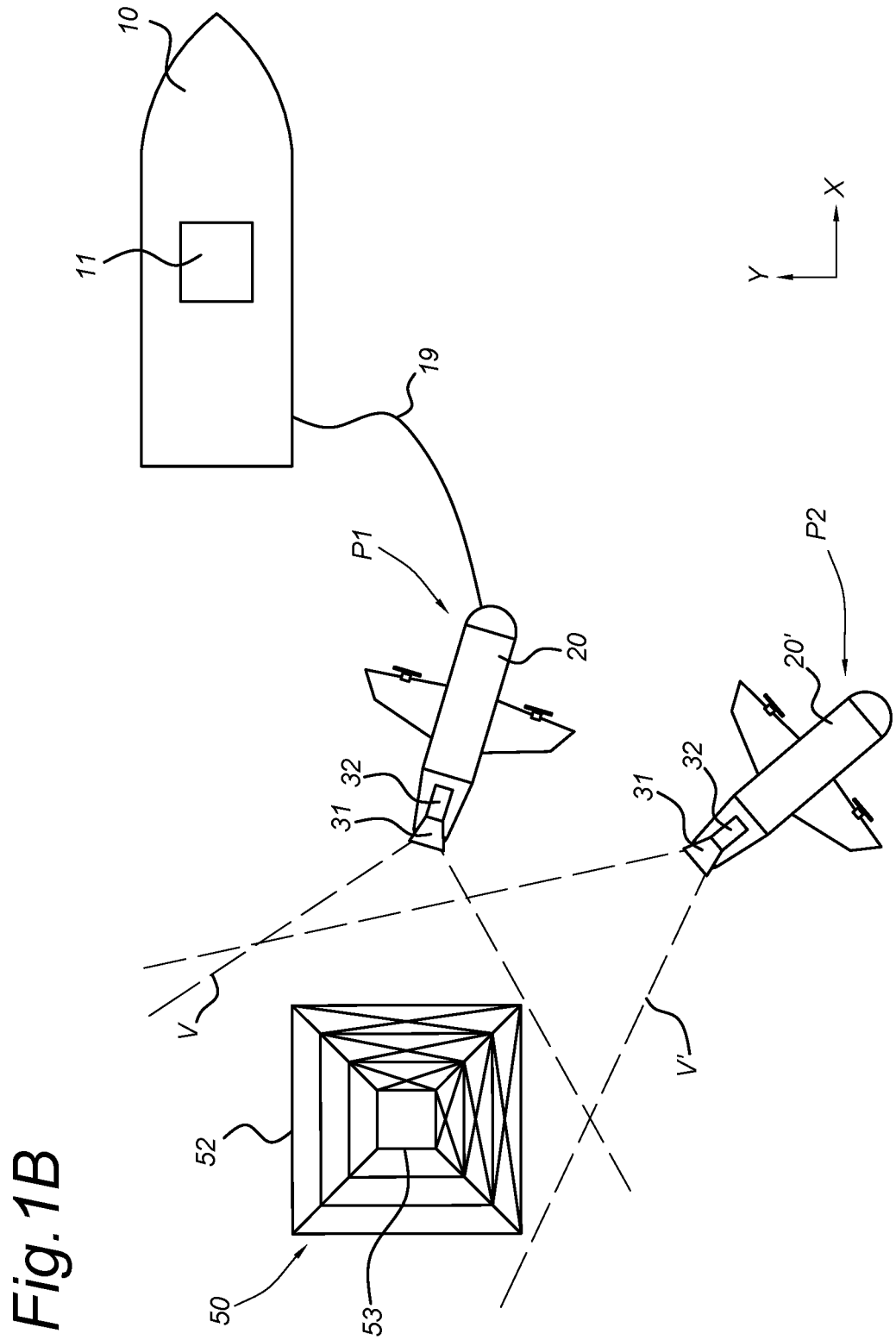

SYSTEM AND METHOD FOR DETERMINATION OF A SPATIAL PROPERTY OF A SUBMERGED OBJECT IN A 3D-SPACE

CROSS-REFERENCE TO RELATED APPLICATIONS

This application is a national stage application of International Application No. PCT/NL2018/050569, which was filed on Sep. 5, 2018, which claims priority to Netherlands Application Number 2019516 filed on Sep. 8, 2017, of which is incorporated by reference in its entirety.

TECHNICAL FIELD

The present invention relates to a system and method for determination of a spatial property, such as heading, position, verticality, attitude, elevation, and/or inclination, of an object in a 3D-space, when the object is partially or completely submerged in the water.

BACKGROUND ART

Offshore structures typically comprise objects, such as construction elements, that are completely or partially submerged below the water. During construction of an offshore structure it is desirable that one or more spatial properties of such a submerged object can be determined from a distance to the object and without physically contacting the object. Once an object has been installed or after the offshore structure has been completed, it is further desirable to be able to measure spatial properties of the object, e.g. to check whether it has been correctly positioned, during maintenance and/or when checking whether the object has been damaged. To facilitate surveying of submerged objects, particularly at depths greater than 10 m below the water surface, submerged remotely operated vehicles (ROV) are known to use sonar. However, the low spatial resolution of sonar makes it difficult to accurately determine spatial properties of the object based on the returned sonar signals.

EP 2 993 620 A1 describes a system for determining the position of an offshore structure, for example an offshore jacket, in a fixed reference frame by observations from a moving reference frame, comprising: a plurality of markers located at defined positions on the structure; an imaging device, arranged to view the markers and generate image data representative of the relative positions of the markers in the moving reference frame; a local positioning system, arranged to determine instantaneous positions of the imaging device in the fixed reference frame and generate position data; and a processing unit, arranged to receive the image data from the imaging device and the position data from the local positioning system and compute the position of the structure based on the defined positions of the markers.

From WO 2016/075231 a method of controlling a subsea platform is known, the method comprising the steps of: providing a database containing object information of objects identified in an environment wherein the platform is operating, generating visualization data of said objects, receiving camera image data from a camera unit disposed on the subsea platform, and composing an image structure based on the object visualization data and the camera image data, wherein the visualization data of said objects are generated using synthetic models thereof. In this process, knowledge of the expected subsea topology, known objects, recognizable landmarks, locations of cameras relative to a frame of reference and other factors may be used. This known system is particularly useful to facilitate navigation of a submerged ROV onto which the camera unit is mounted, if visibility in the water is limited.

A drawback of known systems is that in order for these systems to work, either markings must be attached to the object, or detailed information on an identified object, e.g. a CAD model thereof or its physical properties, dimensional properties, location properties, and display properties, must be known in advance, making these systems unsuitable for ad-hoc measurement of objects for which little or no information is known in advance.

It would be desirable to provide a method that facilitates determining spatial properties of an object on an ad-hoc basis.

SUMMARY OF INVENTION

Therefore, according to a first aspect, there is provided a method for determining a spatial property of a submerged object in a 3D-space, using an underwater moveable platform (such as a remotely operated vehicle or an autonomous underwater vehicle) that is provided with a camera and with a position and orientation measurement system configured to output a position and orientation of the camera. The method comprises capturing, at one position or a plurality of different positions of the camera with respect to the object, image data comprising an image of the object captured by the camera and a representation of a position and orientation of the camera in the 3D space at the time the/each image was captured. Said representation may be obtained using the position and orientation output by the position and orientation measurement system. In addition, the method comprises receiving (e.g. from a user), at a processing unit, dimensions of a 3D bounding volume for the object in the captured image. The method further comprises constructing at the processing unit, for one captured image or for two or more of said captured images, a composite image in which the bounding volume is projected overlaid onto said image. The method comprises receiving, at the processing unit, input for adjusting the position and/or orientation of the bounding volume to improve the visual fit of the bounding volume with the object in the composite image. The method further comprises determining at least one of a heading, a position, a verticality, an attitude, and an inclination of the object, based on the dimensions and/or orientations of the adjusted bounding volume in the 3D space.

In the present context, the term "composite image" refers to an augmented image that is composed of the originally captured image and a visual overlay of enhancement information (e.g. the projected bounding volume). Alternatively, the captured image may initially be subjected to pre-processing e.g. to correct for lens-distortion, and the preprocessed image is combined with the visual overlay to form the composite image. The invention allows spatial features such as heading, position, verticality, attitude, elevation, and/or inclination of the object to be determined indirectly by calculating the heading, position, verticality, attitude, elevation, and/or inclination of the bounding volume. In this manner, it is possible to quickly estimate these properties for the submerged object while an underwater survey of the object is being carried out.

In embodiments, the method further includes displaying of one or more of the captured images including the object on a display to a user. The dimensions of the 3D bounding volume for the object may then be received from the user, so that the composite image may be constructed and displayed to the user. Subsequently, the input for interactively adjusting the position and/or orientation of the bounding volume to improve the visual fit may be received from the user. The processing unit may be connected to the display, and the determined heading, position, verticality, attitude, and/or inclination of the object may thus be output to the user.

By using interactive input from the user to improve the visual fit of the bounding volume with the object the accuracy of these estimates is significantly improved. The interactive adjustment by the user of the visual fit of the bounding box to the object is typically carried out without automated tracking of the object to the bounding box (in case of movement of the object), and without automated detection of features of the object and/or automated matching of such features previously identified features. The method can thus be carried out even when no detailed prior information on the submerged object is available, and as adjusting the bounding volume to visually fit the object is carried out by the user, the processing and memory requirements for a processing unit that is used in carrying out the method are kept low.

In alternative embodiments, the method includes sending one or more of the captured images to a control cabin, receiving the dimensions of the 3D bounding volume from the control cabin, and receiving the input for interactively adjusting the position and/or orientation of the bounding volume from the control cabin. In this case, the determined heading, position, verticality, attitude, and/or inclination of the object may be output to the control cabin.

There are several manners in which the bounding volume may be shown overlain in the composite image, e.g. by showing the edges and vertices of the bounding volume, and/or by showing the surfaces of the bounding volume partially transparent so that the object and the bounding box are visible at the same time. Preferably, the spatial properties of the bounding box are displayed to the user during the interactive adjustment thereof.

The images are captured while the underwater moveable platform is spaced apart from the submerged object, so that collision between the underwater moveable platform and the object is avoided. The camera is may be configured to capture a range of visible light, in particular light in the range of green to blue, e.g. having a wavelength in the range of 420 to 570 nm. In order to provide a better view of the object, the underwater moveable platform may be provided with one or more light sources for illuminating the object, wherein the one or more light sources are preferably configured to emit a majority of its power in the wavelength range of 420 to 570 nm.

In an embodiment, the camera is configured to capture light in the non-visible UV region. This allows the user to better view movement of gas streams in the water.

In an embodiment, the bounding volume is a bounding cylinder, a bounding box, or a convex polyhedron. These shapes lend themselves to be particularly easily adjusted in an interactive manner by the user. Preferably, the method includes letting the user choose between using a bounding cylinder or a bounding box as the bounding volume.

In an alternative embodiment, the bounding volume is a 3D-CAD model of the object. When such a CAD model is available, visual fitting of the bounding volume to the captured images can be carried out particularly easily, e.g. by using a bounding box or bounding cylinder of the 3D-CAD model as the bounding volume for the object.

In an embodiment, the dimensions of the bounding volume remain constant during the interactive adjustment of the position and/or orientation of the bounding volume. For some objects the user may have prior information about the expected dimensions of the bounding volume, e.g. when the object is an object having standardized dimensions. By adjusting only the position and orientation of the bounding box, but not its dimensions, the user can easily check visually whether the dimensions of the object still conform to the expected dimensions.

In an alternative embodiment, the input device is further configured to receive input from the user to interactively adjust the dimensions of the bounding volume. This allows the spatial properties to be measured when no information on the dimensions of the submerged are available at all.

In an embodiment, the method further comprises, subsequent to receiving the dimensions of the bounding box from the user or control cabin, setting at the processing unit and based on the entered dimensions, the position and orientation of the camera at the time the image was captured and on the height and width of the image, an initial position and orientation of the bounding volume such that, if the bounding volume is projected overlaid onto the captured image, the bounding volume is centered on the captured image and fits within the captured image. A main axis of the bounding volume preferably extends parallel to the height or width direction of the captured image. It is thus ensured that the bounding volume fits within a view frustum the camera had at the time the image was captured.

In an embodiment, the position and orientation measurement system is configured to provide one or more position and orientation samples between each capture of an image by the camera. For each captured image, the representation of the position and orientation of the camera may be selected that was sampled at a time closest to the time the image was captured. To achieve this, the position samples, the orientation samples and the captured image are preferably all provided with a time stamp. For a captured image that is provided with a time-stamp, a position sample may be selected which has a time-stamp closest to the image time-stamp, and an orientation sample may be selected which has a time-stamp closest to the image time-stamp. The time stamp for the position and orientation samples and for the captures image are preferably provided by a central clock.

In an alternative embodiment, the position and orientation measurement system is configured to provide multiple position and orientation samples between each capture of an image by the camera. For each captured image, the representation of the position and orientation of the camera in the 3D space at the time the image was captured may be determined by interpolating two or more of said samples taken before and after the time the image was captured. Preferably, the position and orientation measurement system are configured to provide position samples at a first fixed rate and for providing orientation samples at a second fixed rate. In order to be able to correctly determine the position and orientation of the camera, the position and orientation measurement system typically operate at respective sampling rates at least 10-20 Hz and 50 Hz. Though the first and second sampling rate may be adjustable to higher rates, the camera typically has an image capture rate that is either fixed or lower than the first and second rates. By interpolating the samples from the position and orientation measurement system, the position and orientation information from each captured image may be improved.

In an embodiment, the camera is configured to capture each image upon receipt of a trigger signal that is synchronized with or provided by the position and orientation measurement system. This embodiment is especially suitable to be used with a camera that does not have a fixed image sampling rate.

In an embodiment, the method further comprises providing the user with an input device for determining an angle between a line in one of said captured images displayed to the user and the direction of earth gravity, and the user interactively drawing a measurement line in said displayed image and the user interactively adjusting the angle between said measurement line and the direction of earth gravity while displaying the angle to the user. In general, the input device will comprise a computer mouse, keyboard, joystick, or pen or the like. As the orientation and position of camera at the time the image was captured is known, the direction of earth gravity within the captured image is known as well, so that this direction can be shown to the user. However, when using this tool to align the measurement line with a line of the object shown in the image, it is important to ensure that the image has been captured from a suitable point of view, to avoid inaccurate measurements due to perspective distortion.

In an embodiment, the composite image further comprises an overlay of a compass, which shows the direction in which the camera is facing. This facilitates navigation of the underwater moveable platform during surveying.

To facilitate entry of the initial approximation of the position of the bounding volume, the method may comprise refusing entry an approximation of the position and orientation of the bounding volume if the resulting bounding box does not lie partially or completely within the 3D viewing volume of the image displayed to the user. Based on the positional and orientation information of the camera and on the camera configuration, a 3D viewing volume can be calculated for each captured image, independent of whether the object is shown in captured image or not. For instance, if an image of the object was captured when camera was oriented north, then the 3D viewing volume for the image will exclude the volume south of the camera.

In an embodiment, the processing unit is located on a vessel that is spaced apart from the underwater moveable platform and which floats on the water.

In an embodiment, the method is performed while the underwater moveable platform is submerged in vicinity to the submerged object and while spaced apart therefrom. In vicinity here may mean that the camera is located anywhere in the range of up to 25 meters from the object.

According to a second aspect, there is provided a computer readable medium comprising instructions which, when executed by a computer, cause the computer to carry out the method as described herein.

According to a third aspect, and in accordance with advantages and effects described herein above, there is provided a system for determining a spatial property of a submerged object in a 3D-space. The system comprises an underwater moveable platform and a vessel. The underwater moveable platform is provided with a camera and with a position and orientation measurement system configured to output a position and orientation of the camera. The vessel is provided with a processing unit configured to carry out the method according to the first aspect. The vessel may further include a user display for displaying a composite image to a user, and an input device for receiving input from the user.

BRIEF DESCRIPTION OF DRAWINGS

Embodiments will now be described, by way of example only, with reference to the accompanying schematic drawings in which corresponding reference symbols indicate corresponding parts.

FIGS. 1A and 1B schematically show side and top views of an underwater moveable platform with a digital camera, and a submerged object.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

Figure 1A:
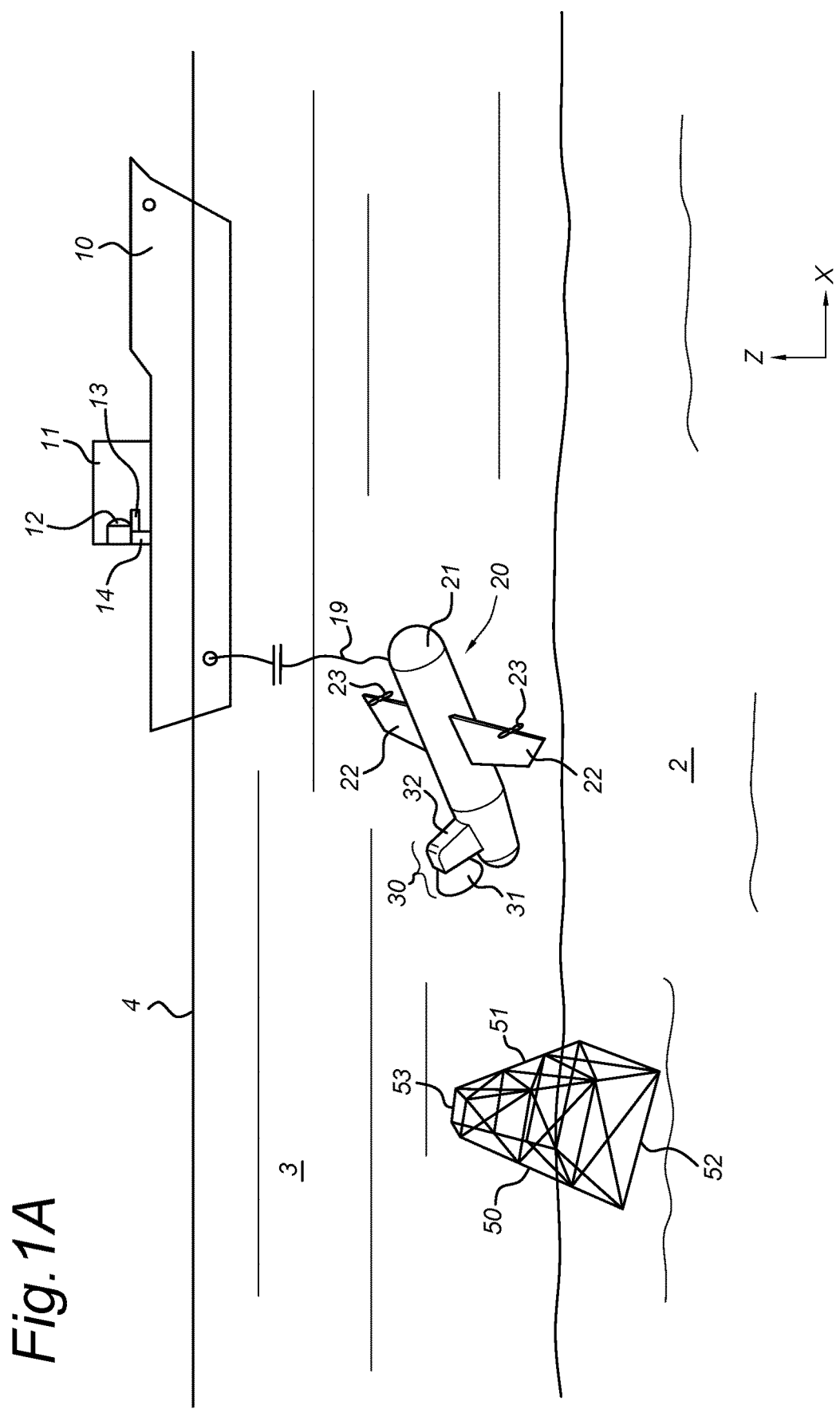

FIGS. 1A and 1B schematically show a side view and a top view of an underwater platform, in this case a remotely operated vehicle (ROV) 20 that is connected to a topside platform, in this case a ship 10, via a tether 19. Typically but not necessarily, a length of the tether 19 is between a few meters and 6 km, allowing the ROV to reach submerged objects in deep waters and/or at positions remote from the ship 10. The tether includes a signal cable, usually a fiber optic cable, for transmitting control signals for steering the ROV. In the example shown, the ROV may be steered by controlling the orientation of steerable fins 22 relative to the main body 21 of the ROV, and/or by individually controlling the speed of rotation of the propellers 23 that are mounted on the steerable fins. The ROV is further provided with a module 30 comprising a camera 31 that is fixedly attached to a position and orientation measurement system 32. The position and orientation measurement system 32 is configured to provide information on the position (X, Y, Z) and orientation (Rx, Ry, Rz) of the camera in the 3D space, preferably at a rate of 25 Hz or more, and may comprise a GPS as well as an inertia measurement system or other kind of attitude measurement system. The position may be determined in a local reference frame or in the Earth's reference frame, depending on the requirements of the situation. In the following, reference will be made to positioning within the Earth's geodetic reference frame unless otherwise stated, although the invention is equally applicable to any chosen reference frame.

The ROV 20 may be controlled, from the vessel, to move about the object 50 from position P1 to position P2. In FIG. 1B, the ROV when in position P2 is referred to using reference numeral 20'. By moving the ROV relative to the object, images of the object when the ROV's camera 31 is at different position and orientation with respect to the object 50 may be captured. The camera 31 can only detect objects that are at least partially within its field of view. In FIGS. 1A and 1B, the camera's field of view when the ROV is in position P1 is illustrated by view frustum V, and the camera's field of view when the ROV is in position P2 is illustrated by view frustum V'. In positions P1,P2 the orientation and position of the camera 30 relative to submerged object 50, the object 50 lies completely within the view frustums V and V' respectively. The object 50 is completely submerged in the water 3 below the water surface 4, and is to form part of a mechanical base for supporting a wellhead. The object 50 comprises a frame 51 with a square bottom edge 52 that is supported on the sea bed 2, which frame tapers upwards towards a square top edge 53 having a smaller than the bottom edge 52.

Generally, the camera and position and orientation system will work at different sampling rates, with the position and orientation system typically sampling position and orientation data at a higher rate than the camera captures digital images. In order to be able to accurately determine the position and orientation of the camera at each time camera captures and image, each of the images captured by the camera and each position and orientation data sampled by the position and orientation system is provided with a timestamp. For a more detailed example on how such timestamps may be provided, reference is made to para. [0044] of European patent application EP2993620A1 by the applicant.

The captured images and position and orientation data, together with the corresponding timestamps, are transmitted from the ROV to the ship 10. Within a control cabin 11 of the ship a user display 12 is arranged for showing the images captured by the digital camera to a user on the ship 10, together with an input device 13, e.g. a keyboard, mouse, or touchscreen for receiving input from the user. A processing unit 14 is provided for calculating, based on captured image information that includes the captured image as well as positional and orientational data of the camera at the time the image was captured, a position and orientation of a bounding box that is to be shown overlaid onto the captured image.

Figure 2A:
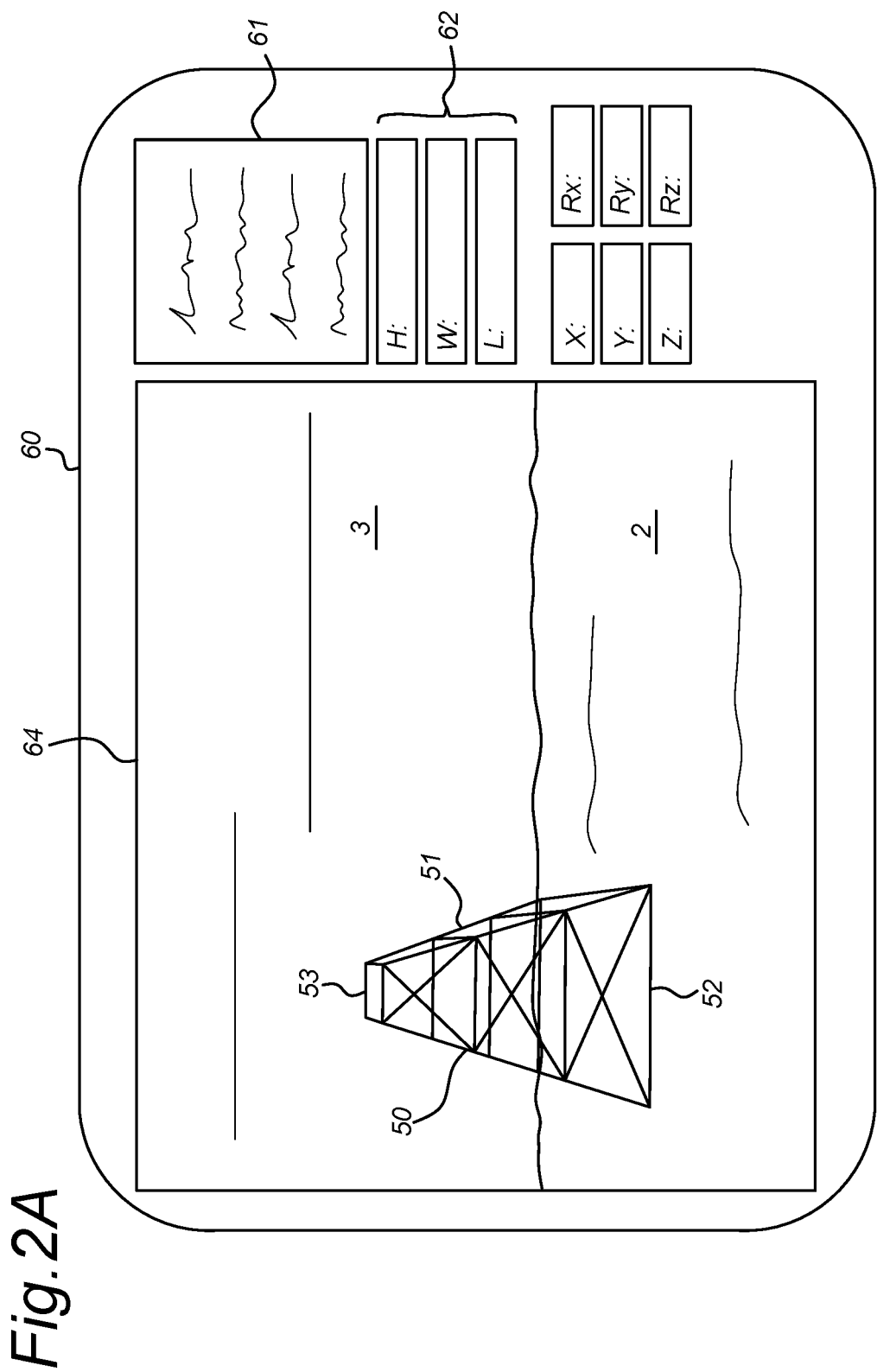
FIG. 2A shows a view of user display on which an image of the submerged object captured with the digital camera is displayed.

FIG. 2A shows a user display 60 on which an image 64 of the submerged object 50 is displayed, wherein the image has been captured using the digital camera 31 when the underwater moveable platform was in position P1 of FIG. 1B. An information window 61 shows information to the user, such as position and orientation of the camera at the time the image was captured. Additionally, the information window 61 provides a space on the display in which spatial properties of a bounding volume, such as a bounding box or bounding cylinder, can be shown to the user. An input window 62 shown on the display allows the user to enter height, width, and length dimensions of a rectangular bounding box into a processing unit, e.g. a computer that is connected to the display. In the view of FIG. 2A no information has yet been input into the input window 62, and consequently, no bounding volume is shown.

Figure 2B:
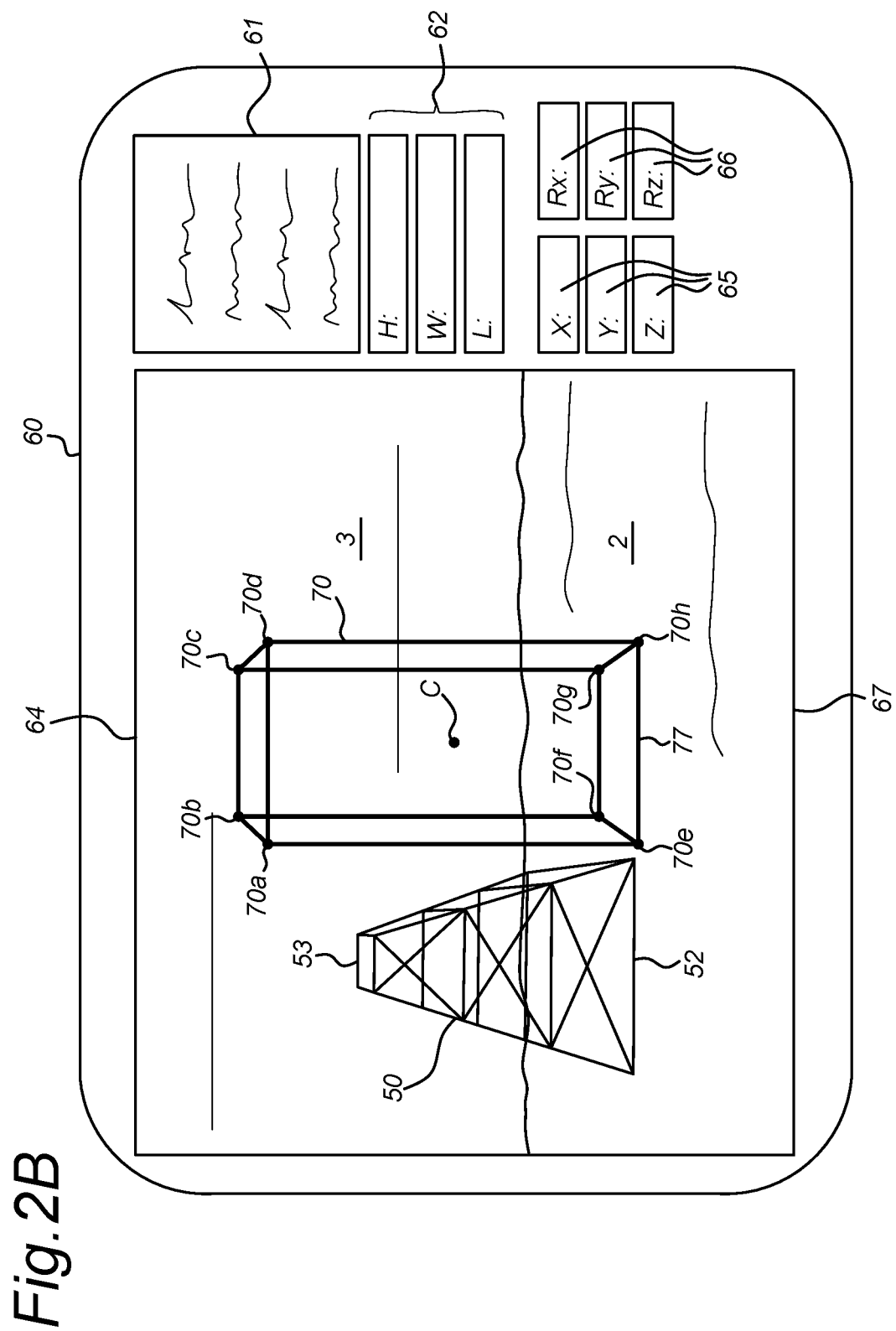
FIG. 2B shows entry of dimensions of a bounding box to be fit around the object.

In FIG. 2B the user has entered provided height, width and length dimensions for a rectangular bounding box 70 to the processing unit via input window 62 at the respective input sections labelled H:, W: and L:. In the example, the user has prior knowledge of the dimensions of the rectangular bounding, e.g. because schematics of the object indicating height width and length thereof, were available to the user before the image was displayed to the user.

As no information on the exact position and orientation of the bounding box 70 has been provided to the processing unit 14, the processing unit initially sets the position of the bounding box such that it is drawn centered on the image with a center C of the bounding box 70 coinciding with the center of the image 64. The orientation of the bounding box 70 is initially set such that a face of the bounding box that is closest to display is parallel to the display plane. In FIG. 2B this face contains vertices 70a, 70d, 70e and 70h of the bounding box. Additionally, the orientation of the bounding box is set such that a lower edge 77, in FIG. 2B between vertices 70e and 70h, of the bounding box is parallel to a lower edge 67 of the rectangular image 64. The orientation of the bounding box is thus partially defined based on the display plane of the display unit, and at least two of the three positional coordinates of the bounding box in the 3D space are initially based on the width and height of the captured image 64. The remaining third positional coordinate of the bounding box in 3D space is initially set by the processing unit such that the entire bounding box is visible on the display. Preferably, the third coordinate is set such that, when the bounding box is displayed on the display, it is spaced apart from the horizontal and vertical edges of the display by a margin of at least 20% of respectively the width and height of the display. For instance, if the captured image has 1600×1080 pixels, then the third coordinate would initially be set such that the bounding box is displayed to lie within a rectangle with lower left coordinate (320,216), lower right coordinate (1280, 216) and upper right coordinate (1280, 864).

Once initial position, dimensions and orientation of the bounding box have been set/entered, information on the spatial properties of the bounding box, such as heading, position, verticality, attitude, elevation and/or inclination of the bounding box, are instantly (e.g. within 0.2 s) displayed in the information window 61.

FIG. 2B shows that initially the position and orientation of the bounding box 70 do not visually match with that of the submerged object 50. Consequently, the information displayed in the information window 61 about spatial properties of the bounding box does not provide accurate information about corresponding spatial properties of the submerged object.

Figure 2C:
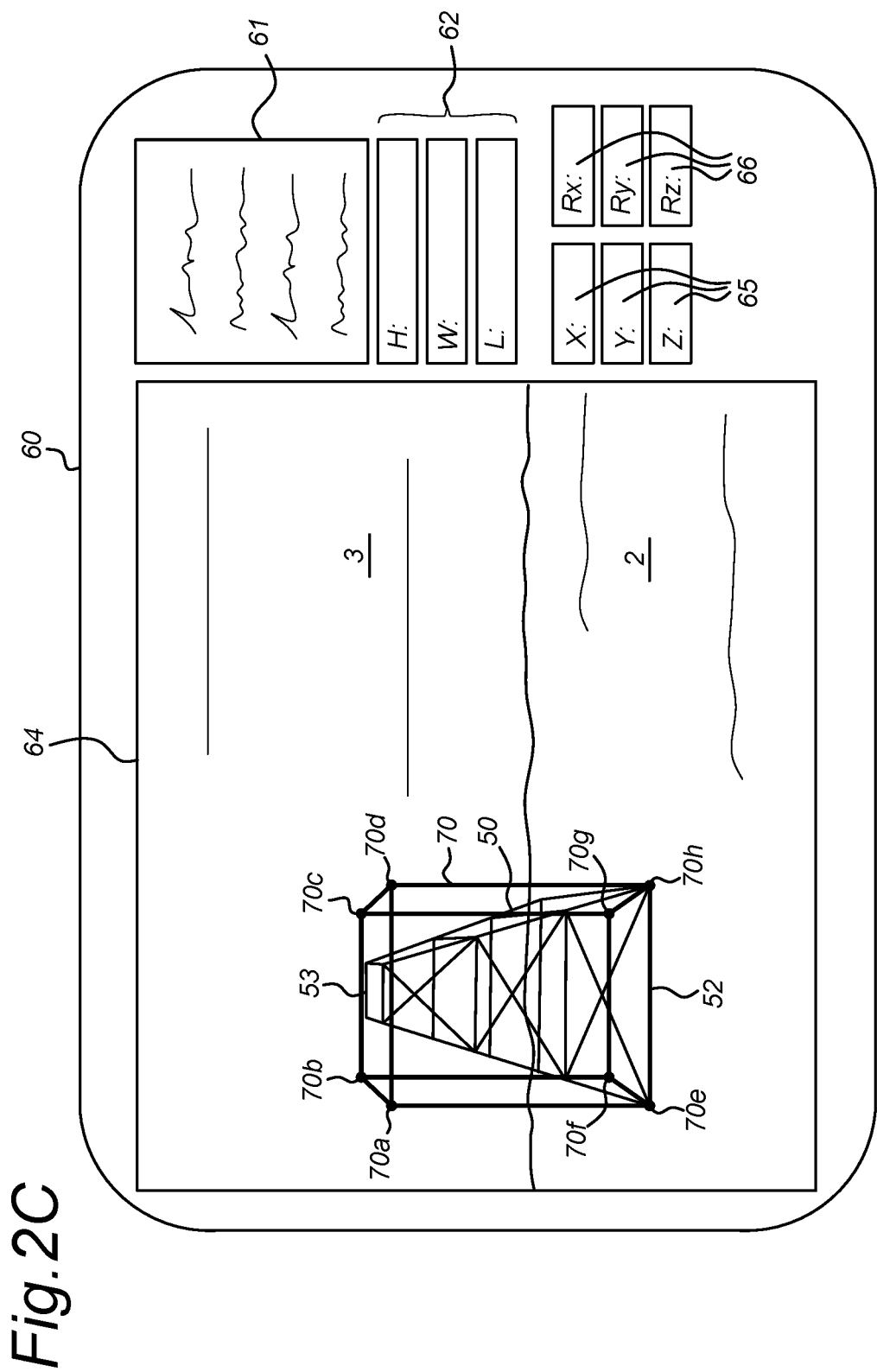
FIG. 2C illustrates how an orientation and position of the bounding box are adjusted by the user, while spatial properties of the bounding box are presented on the user display in real time.

In FIG. 2C the user has interactively adjusted the position and orientation of the bounding box, by entering adjustment values for the position and orientation of the bounding box 70 in input fields 65 and 66 respectively. As a result, there is an improved visual match between the bounding box 70 and the object 50. Instead of, or in addition to, entering adjustment values in input fields 65, 66 the user may adjust the position and/or orientation of the bounding box within the captured image 64 by dragging any one of vertices 70a-70h to translate or rotate the bounding box in the image.

In the view of FIG. 2C vertices 70e-70h of the bounding box 70 appear to substantially coincide with the vertices of rectangular bottom edge 52 of the object 50, while vertices of the rectangular top edge 53 of the object appear to lie substantially within a plane spanned by vertices 70a-70d of the bounding box. In order achieve this view, the user has slightly titled the bounding box around its z-axis, and has translated the bounding box along its X, Y, and Z axis, until satisfied with the shown visual match of the bounding box to the submerged object.

Figure 2D:
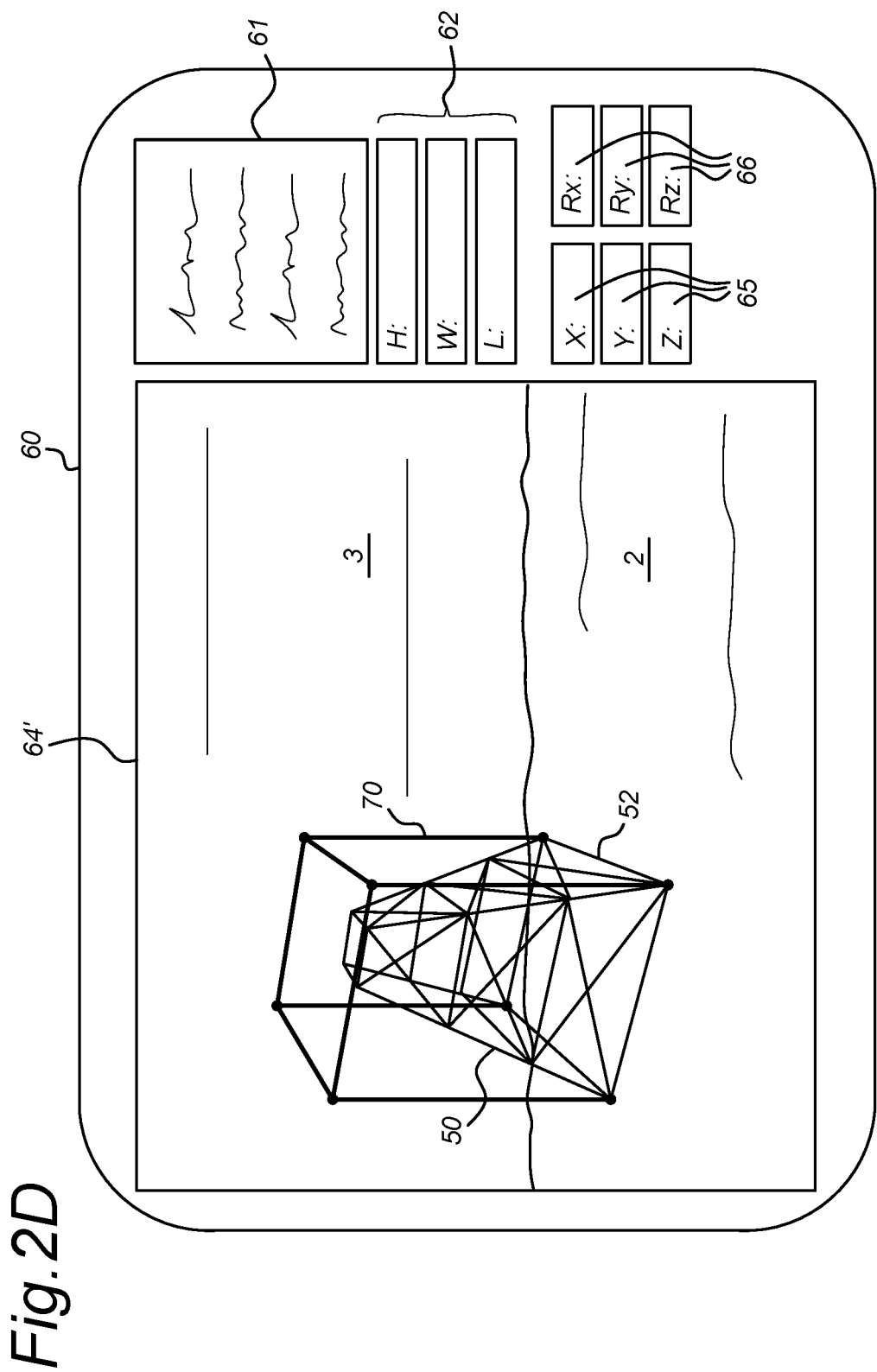
FIG. 2D illustrates how the orientation and position of the bounding box are further adjusted by the user based on another image captured by the camera, while spatial properties of the bounding box are presented on the user display in real time.

FIG. 2D shows an image 64' of the object captured when the underwater platform 20' has moved to position P2' in FIG. 1B. The bounding box for which the dimensions, orientation, and position have interactively adjusted to form the overlay shown in FIG. 2C, is now seen from a different perspective. From this perspective, it is clear that the bounding box should be rotated slightly around Ry in order to let the square bottom edge 52 and the square top edge 53 lie within bottom plane and top plane of the bounding box. In the perspective view of the object shown on the display in FIG. 2C this difference between the bounding box and the submerged object was not as clearly visible. By interactively adjusting the orientation of the bounding box, the user further improves the visual match between the object and the bounding box. The user may view multiple captured images taken at different positions and orientation of the camera relative to the object, and based upon said images improve the visual fit of the bounding box that is shown overlain on each image.

Upon each adjustment of the bounding box, spatial properties of the bounding box are instantaneously (e.g. within 0.2 s) recalculated and displayed in the information window 61. Once the user is satisfied that the bounding box matches the object to a sufficient extent, he can read out the calculated spatial properties of the bounding box from the information window, for instance for further use later on.

With reference to FIGS. 2A-2D a method according to the invention has been described which made use of predetermined dimensions of the bounding volume of the submerged object, wherein the dimensions of the bounding volume substantially correspond to the dimensions of the submerged object. It will however be appreciated that if no such predetermined dimensions are known, the method may still be carried out by letting the user enter an approximation of the dimensions of the bounding volume of the object, based on a captured image. Based on one or more further captured images, the user can subsequently interactively adjust the dimensions of the bounding volume, as well as its orientation and/or position.

Additionally, for measuring some spatial properties of an object based on the corresponding spatial properties of a bounding volume, it is not required that the dimensions of the bounding volume accurately match the dimensions of the submerged volume. For instance, a heading or tilt of a submerged object may accurately be determined if the orientation of the bounding volume sufficiently matches that of the submerged object, even if the dimensions and position of the bounding volume do not match accurately with those of the submerged object.

Figure 3:
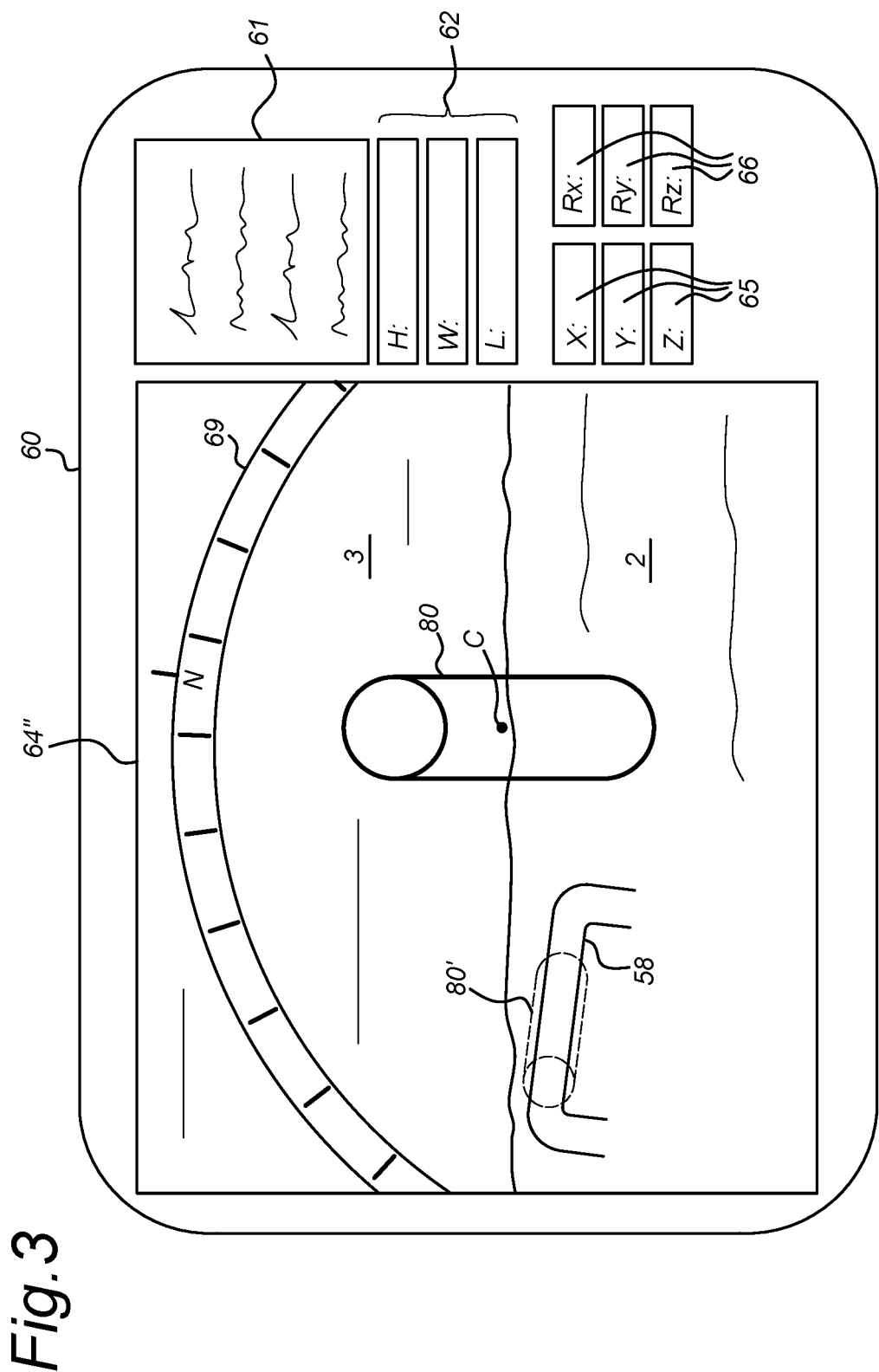
FIG. 3 shows a user display, in which an alternative bounding volume is formed by a bounding cylinder, and in which a virtual compass tool is shown.

FIG. 3 shows an example of a bounding volume in the form of a bounding cylinder, which is more suitable to be visually matched to a cylindrical object such as pipe 58. FIG. 3 shows the bounding cylinder 80 as it is initially displayed overlaid in a captured image 64" on the user display, immediately after the user has entered an approximation of the dimensions of the bounding cylinder. The position, orientation, and dimensions of the cylindrical volume can be interactively adjusted by the user, until it substantially is aligned with pipe 58. For reasons of brevity, FIG. 3 shows the cylinder 80 in its initial position and orientation, as well in its aligned position and orientation as cylinder 80' shown in dotted lines. It will however be understood that the user will only be shown either cylinder 80 in its initial position and orientation or the cylinder in an adjusted position and orientation. Once the user is satisfied that the bounding cylinder matches the object 58 to a sufficient extent, he can read out the calculated spatial properties of the bounding box from the information window 61, for instance for further use later on.

Besides the bounding box, a virtual compass tool 69 is overlaid onto the image 64". As the ROV changes its direction, the virtual compass tool rotates correspondingly in the image that is displayed to the user. The virtual compass tool is motion compensated so that if the camera would look towards the center of the earth, the compass would take the form of a proper circle.

Figure 4:
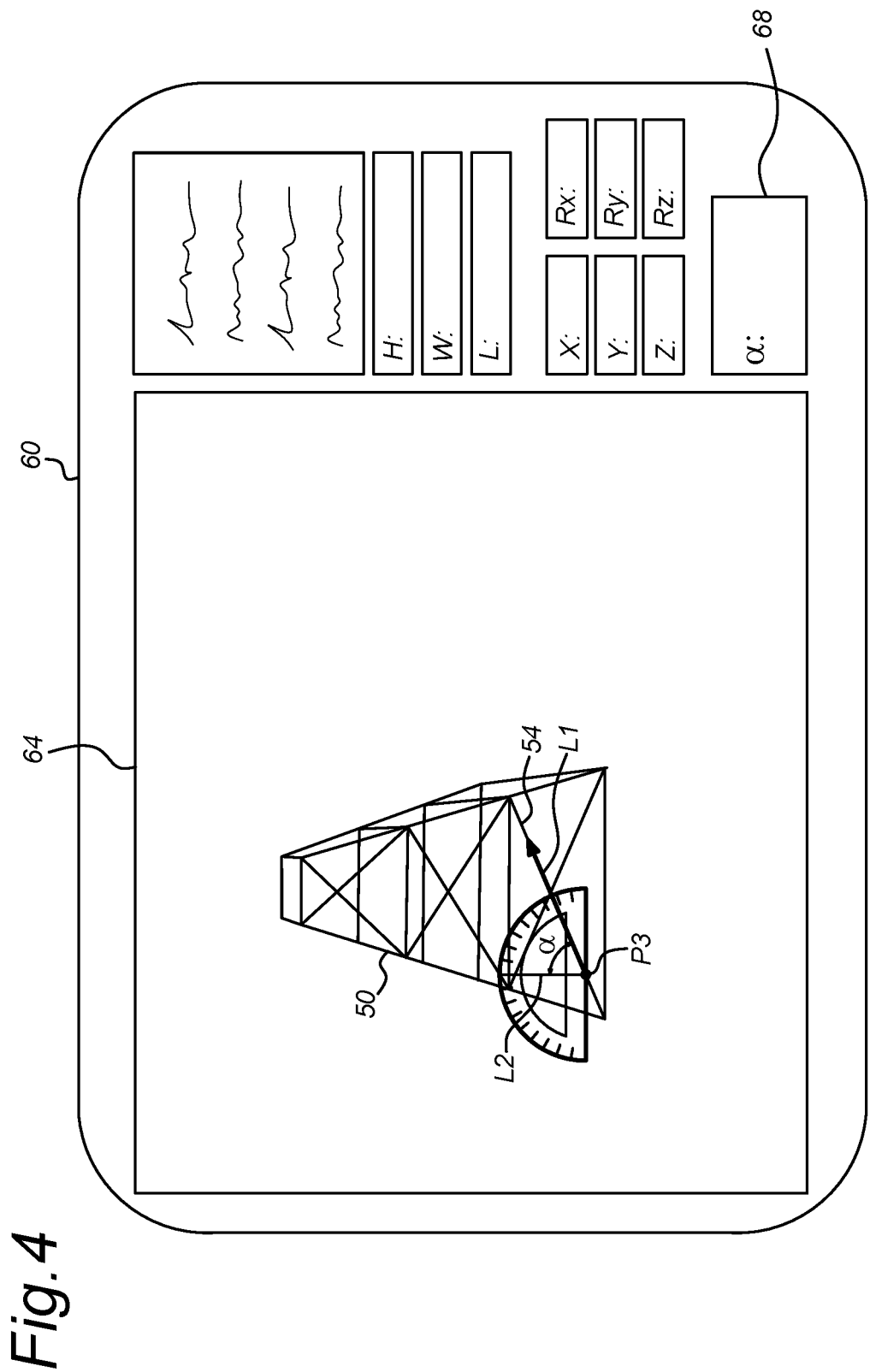
FIG. 4 shows another user display, in which a virtual protractor tool is dynamically shown.

FIG. 4 shows an example of a virtual protractor tool for determining an angle between a line in one of the captured images and the direction of gravity. After selecting to use the virtual protractor tool, the user clicks at a point P3 on the image and pulls out a baseline L1 of the protractor. The virtual protractor is overlaid onto the 2D image with its center point on point P3, and oriented such that its zero degree line L2 is along the direction of gravity, along line L2. The end point of the base line in the captured 2D image can be adjusted interactively by the user, e.g. until it is aligned with a bar 54 of the object, wherein during the interactive adjustment the protractor angle $\alpha$ between line L1 and line L2 is instantaneously calculated and displayed in protractor information window 68.

Figure 5:
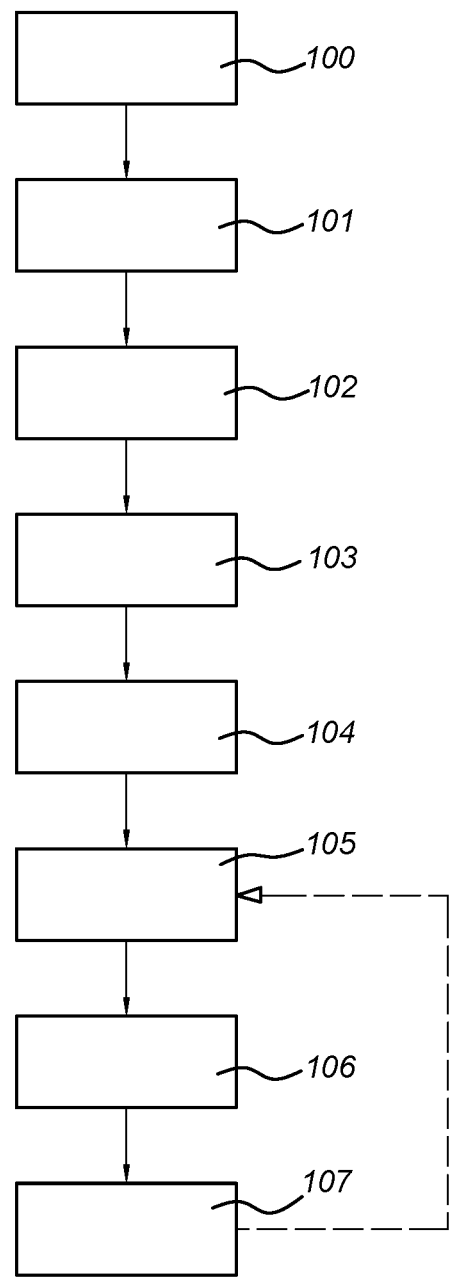
FIG. 5 shows a flow chart of the method according to an embodiment.

FIG. 5 shows a flowchart of a method according to the present invention. In step 100, an underwater moveable platform captures first image data of a submerged object, the first image data comprising a digital image of the object, as well as a representation of a position and orientation of the camera in the 3D space at the time the first image was captured. In step 101, this captured image is displayed to a user. Subsequently, in step 102, input is received from the user on dimensions of a 3D bounding volume (e.g. box) for the object that is shown in the image. In step 103, a composite image is constructed, in which the bounding volume overlaid onto the first image, and the composite image is displayed to the user. In step 104, the underwater moveable platform captures second image data of the submerged object when the camera is at a different location that in step 100. The second image data comprises a second digital image of the object, as well as a representation of a position and orientation of the camera in the 3D space at the time the second image was captured. In step 105 a composite image is constructed, in which the bounding volume overlaid onto the second image, and the composite image is displayed to the user. User input for adjusting the orientation and/or position of the bounding volume in the second image to improve the visual fit of the bounding volume with the object, is received in step 106. Upon receipt of the user input, spatial properties of the bounding volume are instantaneously calculated and output to the user in step 107. Steps 105, 106 and 107 may be repeated, as indicated by the dotted arrow, until the user is satisfied with the visual fit of the bounding volume with the object that is displayed in the composite image. When the bounding volume sufficiently fits the submerged object, spatial properties such as heading, position, verticality, attitude, elevation, and/or inclination, of the object in the 3D space substantially correspond to the same spatial properties of the bounding volume.

In the method described above, in step 105 only the position and/or orientation of the bounding volume are interactively adjusted by the user making the method suitable for situations in which dimensions of an object's bounding volume are known in advance.

If the dimensions of an object's bounding volume are not known in advance, e.g. when carrying out ad-hoc surveying, or when the existence of the submerged objects was not previously known to the user, step 105 may additionally comprise receiving user input for adjusting the dimensions of the bounding volume to improve the visual fit of the bounding volume with the object.

In summary, the invention provides a method for determining a spatial property of a submerged object in a 3D-space, using an underwater moveable platform that is provided with a camera and with a position and orientation measurement system configured to output a position and orientation of the camera, the method comprising receiving user input for visually fitting a bounding volume to the object, and determining the spatial property of the object based on a corresponding spatial property of a bounding volume once the user is satisfied that the bounding volume sufficiently fits the object. The method provides an interactive manner of visually fitting the bounding volume to the object, based on one, two, or more images of the object taken at one or a plurality of different positions and/or orientations of the camera relative to the object, as well as on a representation of a position and orientation of the camera in the 3D space at the time each image was captured.

The present invention has been described above with reference to a number of exemplary embodiments as shown in the drawings. Modifications and alternative implementations of some parts or elements are possible, and are included in the scope of protection as defined in the appended claims. For instance, the exemplary embodiments were described with reference to an ROV. The skilled person will understand that the principles described herein can also be used with other types of underwater moveable platforms, for instance with an autonomous underwater vehicle (AUV).

The invention claimed is:

1. A method for determining a spatial property of a submerged object in a three-dimensional (3D)-space, using an underwater moveable platform that is provided with a camera and with a position and orientation measurement system configured to output a position and orientation of the camera, the method comprising:
    capturing, at one or a plurality of different positions of the camera with respect to the object, image data comprising an image of the object captured by the camera and a representation of a position and orientation of the camera in the 3D space at the time the or each image was captured, wherein said representation is obtained using the position and orientation output by the position and orientation measurement system;
    receiving, at a processing unit, dimensions of a 3D bounding volume for the object in the captured image;
    constructing at the processing unit, for one or more of said captured images, a composite image in which the bounding volume is projected overlaid onto said image, and receiving, at the processing unit, input for adjusting the position and/or orientation of the bounding volume to improve the visual fit of the bounding volume with the object in the composite image; and
    determining at least one of a heading, a position, a verticality, an attitude, and an inclination of the object, based on the dimensions and orientation of the adjusted bounding volume in the 3D space.

2. The method according to claim 1, further comprising:
    displaying one or more of the captured images on a display to a user;
    receiving the dimensions of the 3D bounding volume for the object from the user; displaying the composite image to the user, and
    receiving the input for interactively adjusting the position and/or orientation of the bounding volume from the user.

3. The method according to claim 2, wherein the processing unit is connected to the display, and wherein the object is displayed in the captured image.

4. The method according to claim 2, further comprising:
    outputting the at least one of the heading, the position, the verticality, the attitude, and the inclination of the object to the user or to a control cabin.

5. The method according to claim 2, further comprising receiving input from the user for interactively adjusting the dimensions of the bounding volume to improve the visual fit of the bounding volume with the object displayed in the composite image.

6. The method according to claim 2, further comprising:
    providing the user with an input device for determining an angle between a line in one of said captured images displayed to the user and the direction of earth gravity, and the user interactively drawing a measurement line in said displayed image and the user interactively adjusting the angle between said measurement line and the direction of earth gravity while displaying the angle to the user.

7. The method according to claim 2, further comprising:
    refusing entry of an approximation of the position and orientation of the bounding volume if the resulting bounding volume does not lie partially or completely within the 3D view frustum of the camera corresponding to the image that is displayed to the user.

8. The method according to claim 1, wherein the bounding volume is one of a 3D CAD model of the object, a bounding cylinder, or a bounding box.

9. The method according to claim 1, wherein, during the adjustment of the position and/or orientation of the bounding volume, the dimensions of the bounding volume remain constant.

10. The method according to claim 1, further comprising:
    subsequent to the step of receiving the dimensions of the bounding volume, setting at the processing unit and based on the entered dimensions, the position and orientation of the camera at the time the image was captured and on the height and width of the image, an initial position and orientation of the bounding volume such that, if the bounding volume is projected overlaid onto the captured image, the bounding volume is centered on the captured image and fits within the captured image.

11. The method according to claim 10, wherein a main axis of the bounding volume extends parallel to the height or width direction of the captured image.

12. The method according to claim 1, wherein the position and orientation measurement system is configured to provide one or more position and orientation samples between each capture of an image by the camera, and wherein for each captured image the representation of the position and orientation of the camera is selected that was sampled at a time closest to the time the image was captured.

13. The method according to claim 1, wherein the position and orientation measurement system is configured to provide multiple position and orientation samples between each capture of an image by the camera, and wherein for each captured image the representation of the position and orientation of the camera in the 3D space at the time the image was captured is determined by interpolating two or more of said samples taken before and after the time the image was captured.

14. The method according to claim 1, wherein the camera is configured to capture each image upon receipt of a trigger signal that is synchronized with or provided by the position and orientation measurement system.

15. The method according to claim 1, wherein the composite image further comprises an overlay of a compass that shows the direction in which the camera is facing.

16. The method according to claim 1, wherein the processing unit is located on a vessel that is spaced apart from the moveable underwater platform and which floats on the water.

17. The method according to claim 1, wherein the method is performed while the underwater moveable platform is submerged in vicinity to the submerged object.

18. The method according to claim 1, further comprising:
sending one or more of the captured images to a control cabin;
receiving the dimensions of the 3D bounding volume from the control cabin, and
receiving the input for interactively adjusting the position and/or orientation of the bounding volume from the control cabin.

19. The method of according to claim 1, wherein this underwater moveable platform is either a remotely operated vehicle or an autonomous underwater vehicle.

20. A non-transitory computer readable medium comprising instructions which, when executed by a processor, cause the process to:
receive, from an underwater moveable platform that is provided with a camera and with a position and orientation measurement system configured to output a position and orientation of the camera, image data captured at one or a plurality of different positions of the camera with respect to a submerged object, the image data comprising an image of the submerged object captured by the camera and a representation of a position and orientation of the camera in the 3D space at the time the or each image was captured, wherein said representation is obtained using the position and orientation output by the position and orientation measurement system;
receive dimensions of a 3D bounding volume for the submerged object depicted in the image captured by the camera;
construct, for one or more of said images captured by the camera, a composite image in which the bounding volume is projected overlaid onto said image;
receive input for adjusting the position and/or orientation of the bounding volume to generate an adjusted bounding volume with improved visual fit relative to the submerged object depicted in the composite image; and
determine at least one of a heading, a position, a verticality, an attitude, and an inclination of the submerged object, based on the dimensions and orientation of the adjusted bounding volume in the 3D space.

21. The non-transitory computer readable medium of claim 20, wherein this underwater moveable platform is either a remotely operated vehicle or an autonomous underwater vehicle.

22. A system for determining a spatial property of a submerged object in a 3D-space, the system comprising:
an underwater moveable platform, provided with a camera and with a position and orientation measurement system configured to output a position and orientation of the camera, and
a vessel provided with a processing unit, configured to:
receive, from an underwater moveable platform that is provided with a camera and with a position and orientation measurement system configured to output a position and orientation of the camera, image data captured at one or a plurality of different positions of the camera with respect to a submerged object, the image data comprising an image of the submerged object captured by the camera and a representation of a position and orientation of the camera in the 3D space at the time the or each image was captured, wherein said representation is obtained using the position and orientation output by the position and orientation measurement system;
receive dimensions of a 3D bounding volume for the submerged object depicted in the image captured by the camera;
construct, for one or more of said images captured by the camera, a composite image in which the bounding volume is projected overlaid onto said image;
receive input for adjusting the position and/or orientation of the bounding volume to generate an adjusted bounding volume with improved visual fit relative to the submerged object depicted in the composite image; and
determine at least one of a heading, a position, a verticality, an attitude, and an inclination of the submerged object, based on the dimensions and orientation of the adjusted bounding volume in the 3D space.

23. The system according to claim 22, further comprising:
a user display configured to display to a user the composite image and the one or more images captured by the camera, and
an input device configured to receive from the user the dimensions of the 3D bounding volume for the submerged object, and the input for interactively adjusting the position and/or orientation of the bounding volume.

24. The system of claim 22, wherein this underwater moveable platform is either a remotely operated vehicle or an autonomous underwater vehicle.

* * * * *